United States Patent
Kojima et al.

(10) Patent No.: US 11,125,384 B2
(45) Date of Patent: Sep. 21, 2021

(54) BEARING DEVICE AND EXHAUST TURBINE TURBOCHARGER

(71) Applicant: MITSUBISHI HEAVY INDUSTRIES ENGINE & TURBOCHARGER, LTD., Sagamihara (JP)

(72) Inventors: Yuya Kojima, Tokyo (JP); Takashi Nambu, Tokyo (JP); Yosuke Dammoto, Tokyo (JP); Takaya Futae, Tokyo (JP); Shuichi Isayama, Tokyo (JP); Yoji Akiyama, Tokyo (JP)

(73) Assignee: MITSUBISHI HEAVY INDUSTRIES ENGINE & TURBOCHARGER, LTD, Sagamihara (JP)

(\*) Notice: Subject to any disclaimer, the term of this patent is extended or adjusted under 35 U.S.C. 154(b) by 394 days.

(21) Appl. No.: 16/080,976

(22) PCT Filed: Mar. 1, 2016

(86) PCT No.: PCT/JP2016/056295
§ 371 (c)(1),
(2) Date: Aug. 29, 2018

(87) PCT Pub. No.: WO2017/149671
PCT Pub. Date: Sep. 8, 2017

(65) Prior Publication Data
US 2019/0078732 A1   Mar. 14, 2019

(51) Int. Cl.
*F16N 7/28* (2006.01)
*F16C 33/10* (2006.01)
(Continued)

(52) U.S. Cl.
CPC ............. *F16N 7/28* (2013.01); *F01M 11/02* (2013.01); *F16C 17/04* (2013.01); *F16C 33/101* (2013.01);
(Continued)

(58) Field of Classification Search
CPC ........ F01D 25/18; F02B 39/14; F04D 25/045; F16N 7/28
See application file for complete search history.

(56) References Cited

U.S. PATENT DOCUMENTS

2011/0223010 A1\* 9/2011 Mundinger ........... F01D 25/183
415/170.1
2013/0121820 A1\* 5/2013 Yoshida .................. F01D 25/24
415/205

(Continued)

FOREIGN PATENT DOCUMENTS

JP  6-317171 A   11/1994
JP  11-2136 A   1/1999

(Continued)

OTHER PUBLICATIONS

Written Opinion of the International Searching Authority dated Jun. 7, 2016 in PCT/JP2016/056295.
(Continued)

*Primary Examiner* — Michael R Mansen
*Assistant Examiner* — Mark K Buse
(74) *Attorney, Agent, or Firm* — Birch, Stewart, Kolasch & Birch, LLP.

(57) ABSTRACT

The present invention improves the drainability of lubricating oil at a thrust bearing. The present invention comprises: a rotating shaft; a thrust bearing that is provided to the rotating shaft and restricts the axial-direction movement of the rotating shaft; and an oil reservoir part (20) that has formed therein an oil reservoir space (20a) that is provided to be adjacent to the thrust bearing in the axial direction and to open downward, the oil reservoir space (20a) having formed therein an inclined surface (20aa) that, in a region that is in and below a horizontal plane H that passes through the center of the rotating shaft, protrudes to the thrust
(Continued)

bearing side and is inclined along the rotational direction of the rotating shaft.

5 Claims, 10 Drawing Sheets

(51) Int. Cl.
    *F01M 11/02*     (2006.01)
    *F16C 17/04*     (2006.01)
    *F16N 31/00*     (2006.01)
    *F16H 57/04*     (2010.01)
    *F16N 29/02*     (2006.01)
    *F16C 33/66*     (2006.01)

(52) U.S. Cl.
CPC ........ *F16C 33/103* (2013.01); *F16C 33/1065* (2013.01); *F16H 57/0423* (2013.01); *F16H 57/0436* (2013.01); *F16H 57/0457* (2013.01); *F16N 29/02* (2013.01); *F16N 31/00* (2013.01); *F01M 2011/021* (2013.01); *F16C 33/6666* (2013.01); *F16C 2360/24* (2013.01); *F16H 57/0447* (2013.01); *F16H 57/0469* (2013.01); *F16N 2210/14* (2013.01)

(56) References Cited

U.S. PATENT DOCUMENTS

| | | | | |
|---|---|---|---|---|
| 2014/0090375 A1* | 4/2014 | Kanzaka | ............... | F02B 39/005 60/605.3 |
| 2014/0112776 A1* | 4/2014 | Kamata | ............... | F04D 29/046 415/229 |
| 2014/0119898 A1* | 5/2014 | Nishida | ............... | F01D 25/18 415/170.1 |
| 2014/0127012 A1* | 5/2014 | Maniar | ............... | F02C 7/06 415/230 |
| 2015/0078884 A1* | 3/2015 | Uneura | ............... | F16C 33/107 415/104 |
| 2015/0276523 A1* | 10/2015 | Uneura | ............... | F04D 29/266 73/862.49 |
| 2017/0009810 A1* | 1/2017 | Futae | ............... | F02B 33/40 |
| 2017/0044933 A1* | 2/2017 | Uneura | ............... | F16C 27/02 |
| 2017/0067472 A1* | 3/2017 | Day | ............... | F04D 29/284 |
| 2017/0074278 A1* | 3/2017 | Watanabe | ............... | F01D 9/026 |
| 2017/0108035 A1* | 4/2017 | Hinds | ............... | F01D 25/166 |
| 2017/0260861 A1* | 9/2017 | Yoshida | ............... | F01D 11/08 |
| 2017/0276233 A1* | 9/2017 | Nishioka | ............... | F01D 25/18 |
| 2018/0003081 A1* | 1/2018 | Isayama | ............... | F04D 29/063 |
| 2018/0156065 A1* | 6/2018 | Bunno | ............... | F16C 27/02 |
| 2019/0048933 A1* | 2/2019 | Kojima | ............... | F01M 1/18 |
| 2019/0078509 A1* | 3/2019 | Futae | ............... | F02B 39/005 |
| 2019/0203635 A1* | 7/2019 | Futae | ............... | F16N 7/36 |

FOREIGN PATENT DOCUMENTS

| | | |
|---|---|---|
| JP | 3253000 B2 | 2/2002 |
| JP | 2012-31810 A | 2/2012 |
| JP | 2013-177852 A | 9/2013 |
| JP | 2015-86705 A | 5/2015 |

OTHER PUBLICATIONS

Extended European Search Report dated Jan. 28, 2019, for European Application No. 16892515.4.

* cited by examiner (THRUST BEARING SIDE)

(THRUST BEARING SIDE)

(THRUST BEARING SIDE)

(THRUST BEARING SIDE)

BEARING DEVICE AND EXHAUST TURBINE TURBOCHARGER

TECHNICAL FIELD

The present invention relates to a bearing device and an exhaust turbine turbocharger to which the bearing device is applied.

BACKGROUND ART

In the related art, for example, PTL 1 discloses an oil leakage prevention device of a turbocharger. In the turbocharger, in order to receive thrust of a rotating shaft, a thrust bearing is configured in which a thrust bush is rotatably provided on the rotating shaft and a thrust disk fixed to a bearing housing engages with an annular groove formed on the thrust bush. A lubricating oil is supplied to the thrust bearing so as to prevent seizure. A portion of the lubricating oil supplied to the thrust bearing is accommodated in the deflector and is discharged to a lower portion of the bearing housing via a tongue piece on a lower end of the deflector.

CITATION LIST

Patent Literature

[PTL 1] Japanese Unexamined Patent Application Publication No. 11-2136

SUMMARY OF INVENTION

Technical Problem

However, if an amount of the lubricating oil from the thrust bearing to the deflector increases and an inside of the deflector is filled with the lubricating oil, the lubricating oil is not discharged from the deflector by a rotation of the rotating shaft, reflows into the deflector, and thus, a loss is generated by a stirring resistance. In addition, if the inside of the deflector is filled with the lubricating oil, the lubricating oil leaks from a seal surface which is a sliding surface between the deflector and the thrust bush, and there is a concern that sealability may decrease. Accordingly, it is preferable to improve drainability of the lubricating oil in the thrust bearing.

The present invention is made to solve the above-described problems and an object thereof is to provide a bearing device and an exhaust turbine turbocharger capable of improving drainability of the lubricating oil in the thrust bearing.

Solution to Problem

In order to achieve the above-described object, according to an aspect of the present invention, there is provided a bearing device including: a rotating shaft; a thrust bearing which is provided on the rotating shaft and regulates an axial movement of the rotating shaft; and an oil storage portion which includes an oil storage space which is adjacent to the thrust bearing in an axial direction to be formed in an arc shape to surround the rotating shaft and is formed to have an opened lower portion, the oil storage portion having an inclined surface which is formed to be inclined in a rotation direction of the rotating shaft while protruding toward the thrust bearing side in a region below a horizontal plane passing through a center of the rotating shaft in the oil storage space.

According to this bearing device, the lubricating oil which has reached an oil storage space from the thrust bearing flows to a lower portion of the oil storage space. However, the lubricating oil flows along the arc of the oil storage space in the rotation direction of the rotating shaft. In addition, the lubricating oil which passes through the center of the rotating shaft and flows to the region below the horizontal plane is guided to the inclined surface and is fed to the thrust bearing side. As a result, it is possible to prevent the lubricating oil flowing through the oil storage space from reflowing into the oil storage space, and thus, it is possible to improve drainability of the lubricating oil in the thrust bearing.

In addition, in the bearing device of the present invention, the oil storage portion includes a plate-shaped deflector provided between the thrust bearing and an insert portion supporting the thrust bearing with respect to a bearing housing in which the rotating shaft and the thrust bearing are accommodated.

According to this bearing device, a function of the oil storage portion is provided in the deflector, and thus, it is possible to improve the drainability of the lubricating oil in the thrust bearing.

In addition, in the bearing device of the present invention, the oil storage portion includes an insert portion supporting the thrust bearing with respect to a bearing housing in which the rotating shaft and the thrust bearing are accommodated.

According to this bearing device, the function of the oil storage portion is provided in the insert portion, and thus, it is possible to improve the drainability of the lubricating oil in the thrust bearing.

In addition, in the bearing device of the present invention, a notch is formed in a lower portion of the thrust bearing and an opening end of the notch is provided to be continuous to the inclined surface.

According to this bearing device, if the opening end of the notch coincides with the inclined surface, the following excellent effects can be obtained. That is, it is possible to prevent the lubricating oil guided to the inclined surface by the opening end of the notch from being cut, and thus, it is possible to prevent the lubricating oil flowing through the oil storage space from reflowing into the oil storage space.

In addition, in the bearing device of the present invention, the opening end of the notch has an inclined surface continuous to the inclined surface.

According to this bearing device, the opening end of the notch is formed to have the inclined surface, and thus, the following excellent effects can be obtained. That is, it is possible to prevent the lubricating oil guided to the inclined surface by the opening end of the notch from being cut while being guided to the outer side further opened from the inclined surface of the opening end, and thus, it is possible to prevent the lubricating oil flowing through the oil storage space from reflowing into the oil storage space.

In order to achieve the above-described object, according to another aspect of the present invention, there is provided an exhaust turbine turbocharger including: a turbine; a compressor; a rotating shaft which coaxially connects the turbine and the compressor to each other; a thrust bearing which is provided on the rotating shaft and regulates an axial movement of the rotating shaft; and any one of the above-described bearing devices.

According to this exhaust turbine turbocharger, it is possible to improve the drainability of the lubricating oil in the thrust bearing, and it is possible to prevent a loss in a rotation of the rotating shaft caused by a stirring resistance and it is possible to prevent the lubricating oil from leaking from a seal surface and the sealability from decreasing. As a result, it is possible to achieve high efficiency.

Advantageous Effects of Invention

According to this invention, it is possible to improve the drainability of the lubricating oil in the thrust bearing.

DESCRIPTION OF EMBODIMENTS

Hereinafter, an embodiment according to the present invention will be described in detail with reference to the drawings. In addition, the present invention is not limited by the embodiment. In addition, constituent elements in the following embodiment include constituent elements which can be easily replaced by those skilled in the art or constituent elements which are substantially the same.

Figure 1:
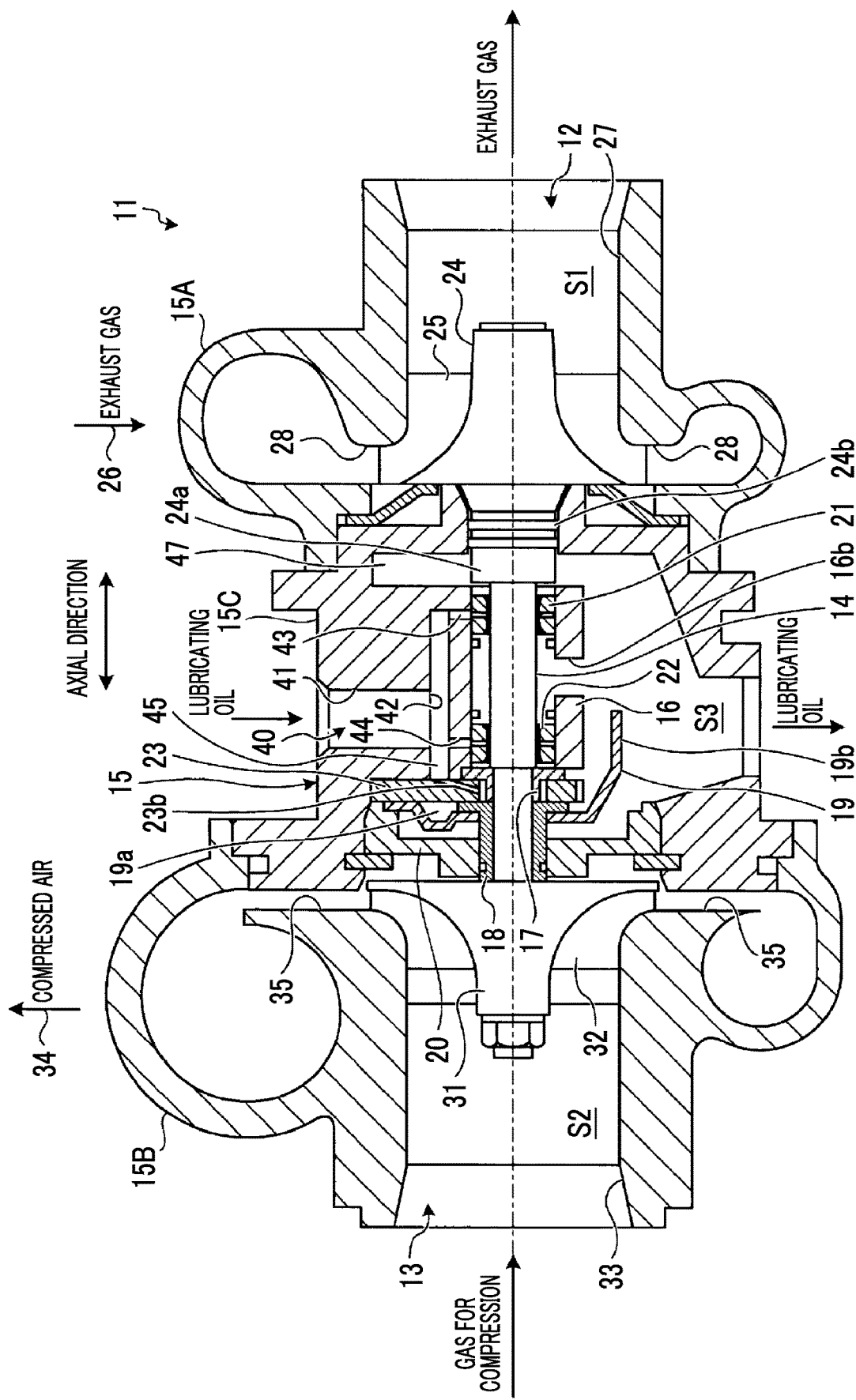
FIG. 1 is an overall configuration view of an exhaust turbine turbocharger according to an embodiment of the present invention.
Figure 2:
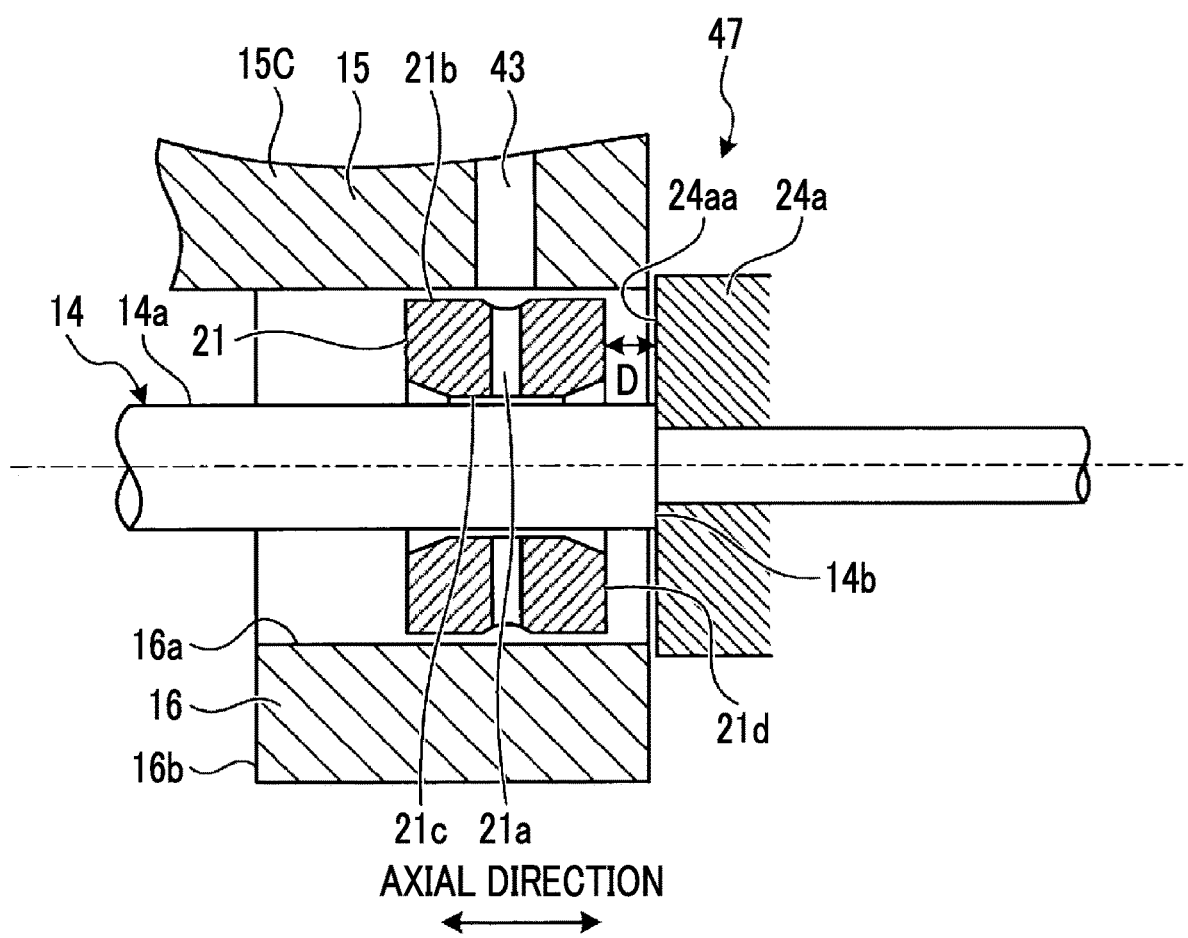
FIG. 2 is an enlarged view of a bearing portion of the exhaust turbine turbocharger according to the embodiment of the present invention.
Figure 3:
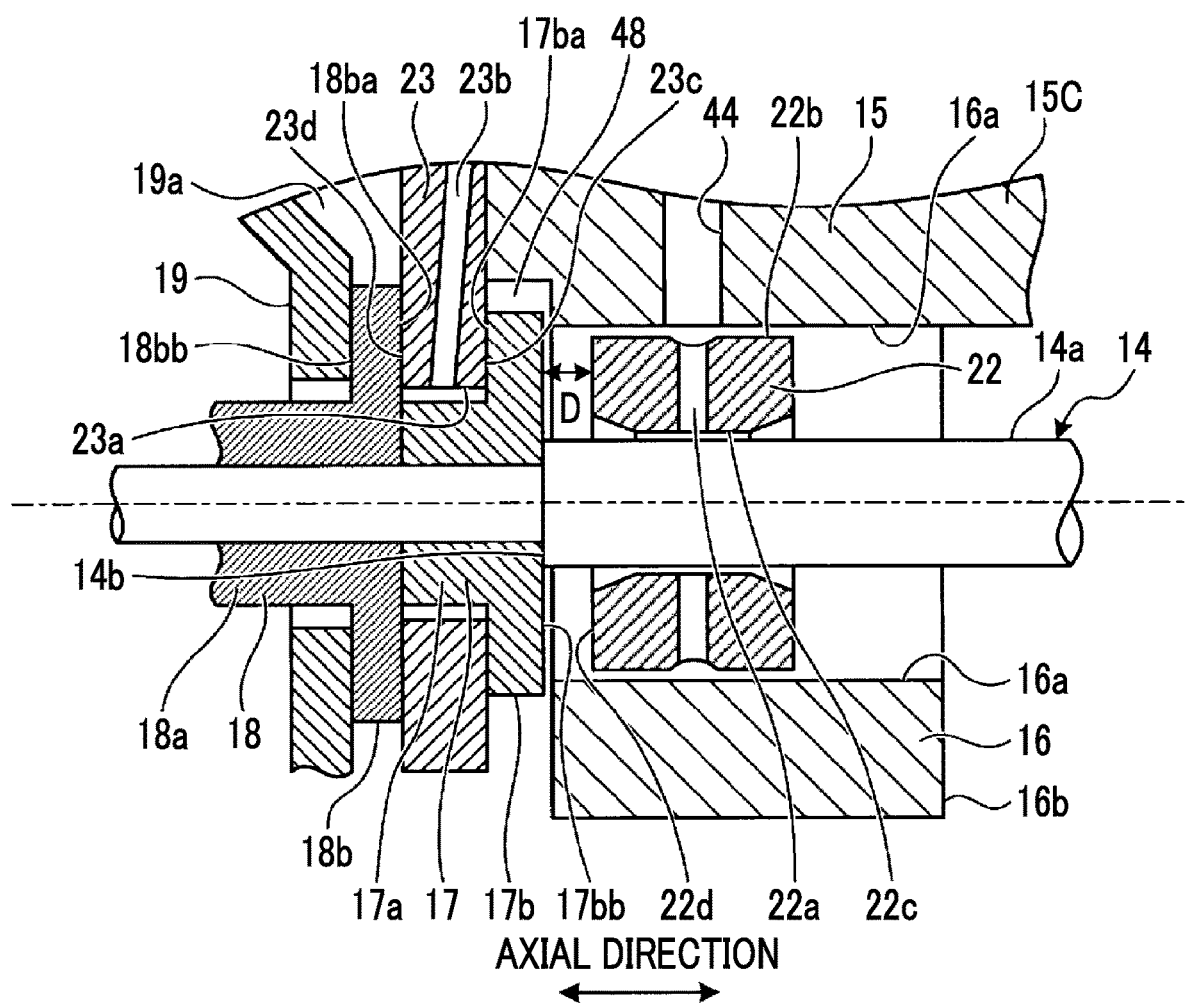
FIG. 3 is an enlarged view of the bearing portion of the exhaust turbine turbocharger according to the embodiment of the present invention.

FIG. 1 is an overall configuration view of an exhaust turbine turbocharger according to the present embodiment. FIG. 2 is an enlarged view of a bearing portion of the exhaust turbine turbocharger according to the present embodiment. FIG. 3 is an enlarged view of the bearing portion of the exhaust turbine turbocharger according to the present embodiment.

An exhaust turbine turbocharger 11 shown in FIG. 1 mainly includes a turbine 12, a compressor 13, and a rotating shaft 14, and these are accommodated in a housing 15.

An inside of the housing 15 is formed in a hollow shape, and the housing 15 includes a turbine housing 15A forming a first space portion S1 in which a configuration of the turbine 12 is accommodated, a compressor cover 15B forming a second space portion S2 in which a configuration of the compressor 13 is accommodated, and a bearing housing 15C forming a third space portion S3 in which the rotating shaft 14 is accommodated. The third space portion S3 of the bearing housing 15C is positioned between the first space portion S1 of the turbine housing 15A and the second space portion S2 of the compressor cover 15B.

In the rotating shaft 14, an end portion on the turbine 12 side is rotatably supported by a journal bearing 21 which is a turbine-side bearing, an end portion on the compressor 13 side is rotatably supported by a journal bearing 22 which is a compressor-side bearing, and a movement of the rotating shaft 14 in an axial direction in which the rotating shaft 14 extends is regulated by a thrust bearing 23. In addition, a turbine disk 24 of the turbine 12 is fixed to one end portion of the rotating shaft 14 in the axial direction. The turbine disk 24 is accommodated in the first space portion S1 of the turbine housing 15A, and a plurality of turbine blades 25 forming an axial flow type are provided on an outer peripheral portion of the turbine disk 24 with a predetermined gap therebetween in a circumferential direction. In addition, a compressor impeller 31 of the compressor 13 is fixed to the other end portion of the rotating shaft 14 in the axial direction, the compressor impeller 31 is accommodated in the second space portion S2 of the compressor cover 15B, and a plurality of blades 32 are provided on an outer peripheral portion of the compressor impeller 31 with a predetermined gap therebetween in the circumferential direction.

Moreover, the turbine housing 15A includes an inlet passage 26 of an exhaust gas and an outlet passage 27 of the exhaust gas with respect to the turbine blades 25. In addition, in the turbine housing 15A, a turbine nozzle 28 is provided between the inlet passage 26 and the turbine blades 25, an axial exhaust gas flow which is statically pressure-expanded by the turbine nozzle 28 is led to the plurality of turbine blades 25 by the turbine nozzle 28, and thus, the turbine 12 can be rotationally driven. In addition, the compressor cover 15B includes an air intake port 33 and a compressed air discharge port 34 with respect to the compressor impeller 31. In addition, in the compressor cover 15B, a diffuser 35 is provided between the compressor impeller 31 and the compressed air discharge port 34. Air compressed by the compressor impeller 31 is discharged through the diffuser 35.

In the exhaust turbine turbocharger 11 configured as described above, the turbine 12 is driven by an exhaust gas discharged from an engine (not shown), a rotation of the turbine 12 is transmitted to the rotating shaft 14 to drive the compressor 13, and the compressor 13 compresses a combustion gas to supply the compressed combustion gas to the engine. Accordingly, the exhaust gas from the engine passes through the inlet passage 26 of the exhaust gas and is statically pressure-expanded by the turbine nozzle 28, and the axial exhaust gas flow is led to the plurality of turbine blades 25. Therefore, the turbine 12 is rotationally driven via the turbine disk 24 to which the plurality of turbine blades 25 are fixed. In addition, the exhaust gas which drives the plurality of turbine blades 25 is discharged to the outside from the outlet passage 27. Meanwhile, if the rotating shaft 14 is rotated by the turbine 12, and the integral compressor impeller 31 is rotated, and air is sucked through the air intake port 33. The sucked air is compressed by the compressor impeller 31 and becomes compressed air, and the compressed air is supplied from the compressed air discharge port 34 to the engine through the diffuser 35.

In addition, in the exhaust turbine turbocharger 11, a lubricating oil supply passage 40 through which a lubricating oil is supplied to the journal bearings 21 and and the thrust bearing 23 is provided in the bearing housing 15C. The lubricating oil supply passage 40 includes a first supply passage 41 formed in a radial direction on an upper portion of the bearing housing 15C, a second supply passage 42 formed in the axial direction on the upper portion of the bearing housing 15C, a third supply passage 43 which communicates with the journal bearing 21, a fourth supply passage 44 which communicates with the journal bearing 22, and a fifth supply passage 45 which communicates with the thrust bearing 23. A base end portion of the first supply passage 41 is connected to a lubricating oil tank (not shown), and a tip end portion thereof is connected to an intermediate portion of the second supply passage 42. A base end portion of the third supply passage 43 communicates with the second supply passage 42 and a tip end portion thereof communicates with the journal bearing 21. A base end portion of the fourth supply passage 44 communicates with the second supply passage 42 and a tip end portion thereof communicates with the journal bearing 22. A base end portion of the fifth supply passage 45 communicates with the second supply passage 42 and a tip end portion thereof communicates with the thrust bearing 23.

As shown in FIGS. 1 to 3, each of the journal bearings 21 and 22 is formed in a cylindrical shape. The journal bearings 21 and 22 are accommodated in a columnar space which is formed by a support portion 16 provided in the third space portion S3 in the bearing housing 15C. In the support portion 16 supporting the respective journal bearings 21 and 22, a passage 16b leading to a lower portion of the third space portion S3 between the journal bearings 21 and 22 is formed.

As shown in FIG. 2, the journal bearing 21 is rotatably supported between an outer peripheral surface 21b and an inner surface 16a of the support portion 16, and the journal bearing 21 rotatably supports the rotating shaft 14 between an inner peripheral surface 21c and an outer peripheral surface 14a of the rotating shaft 14. In the journal bearing 21, the tip end portion of the third supply passage 43 communicate with the outer peripheral surface 21b. In addition, in the journal bearing 21, a passage 21a penetrating the journal bearing 21 from the outer peripheral surface 21b to the inner peripheral surface 21c is formed, and the lubricating oil supplied from the third supply passage 43 to the outer peripheral surface 21b is led to a portion between the inner peripheral surface 21c and the outer peripheral surface 14a of the rotating shaft 14 through the passage 21a. Accordingly, the journal bearing 21 is rotatably supported by the support portion 16 using the lubricating oil supplied to the portion between the outer peripheral surface 21b and the inner surface 16a of the support portion 16, and the journal bearing 21 rotatably supports the rotating shaft 14 by the lubricating oil supplied to a portion between the inner peripheral surface 21c and the outer peripheral surface 14a of the rotating shaft 14.

Here, as shown in FIG. 1, the turbine disk 24 of the turbine 12 includes a boss portion 24a protruding to the compressor 13 side such that the turbine disk 24 is disposed to be adjacent to the journal bearing 21 in the axial direction. The boss portion 24a is formed in a cylindrical shape, is fitted to a portion in which an end portion of the rotating shaft 14 on the turbine 12 side is formed in a small diameter via a step portion 14b, and abuts against the step portion 14b to be positioned in the axial direction. As shown in FIG. 2, the portion of the boss portion 24a abutting against the step portion 14b is a disk member which covers an opening of a columnar space on the turbine 12 side formed by the support portion 16, and the boss portion 24a includes a facing portion 24aa which is disposed so as to face the side surface portion 21d of the journal bearing 21 with a gap D therebetween in the axial direction. In addition, in the bearing housing 15C, an oil discharge space chamber 47 is formed on an outer peripheral portion of the boss portion 24a. Moreover, in the turbine disk 24 of the turbine 12, a seal portion 24b is formed between the boss portion 24a and the turbine disk 24 in the axial direction. The seal portion 24b forms a seal portion with the bearing housing 15C.

In the journal bearing 21, the lubricating oil supplied to the outer peripheral surface 21b side and the inner peripheral surface 21c side flows from the passage 16b of the support portion 16 toward a lower portion of the third space portion S3 on the compressor 13 side. Meanwhile, in the journal bearing 21, the lubricating oil supplied to the outer peripheral surface 21b side and the inner peripheral surface 21c side flows to the side surface portion 21d side on the turbine 12 side, is fed to a radially outer side by a centrifugal force of the rotation of the rotating shaft 14 in the facing portion 24aa of the facing boss portion 24a so as to reach the oil discharge space chamber 47 on an outer peripheral portion of the boss portion 24a, and flows from the oil discharge space chamber 47 to the lower portion of the third space portion S3.

As shown in FIG. 3, the journal bearing 22 is rotatably supported between the outer peripheral surface 22b and the inner surface 16a of the support portion 16, and the journal bearing 22 rotatably supports the rotating shaft 14 between an inner peripheral surface 22c and the outer peripheral surface 14a of the rotating shaft 14. In the journal bearing 22, the tip end portion of the fourth supply passage 44 communicates with the outer peripheral surface 22b. In addition, in the journal bearing 22, a passage 22a penetrating the journal bearing 22 from the outer peripheral surface 22b to the inner peripheral surface 22c is formed, and the lubricating oil supplied from the fourth supply passage 44 to the outer peripheral surface 22b is led to a portion between the inner peripheral surface 22c and the outer peripheral surface 14a of the rotating shaft 14 through the passage 22a. Accordingly, the journal bearing 22 is rotatably supported by the support portion 16 using the lubricating oil supplied to the portion between the outer peripheral surface 22b and the inner surface 16a of the support portion 16, and the journal bearing 22 rotatably supports the rotating shaft 14 by the lubricating oil supplied to a portion between the inner peripheral surface 22c and the outer peripheral surface 14a of the rotating shaft 14.

As shown in FIG. 1, the thrust bearing 23 is disposed on the compressor 13 side to be adjacent to the journal bearing 22 in the axial direction of the rotating shaft 14. As shown in FIG. 3, the thrust bearing 23 is formed in a plate shape having an insertion hole 23a into which the rotating shaft 14 is inserted and is fixed to the bearing housing 15C. The thrust bearing 23 regulates an axial movement of the rotating shaft 14 via a thrust ring 17 and a thrust sleeve 18.

As shown in FIG. 3, the thrust ring 17 includes a boss portion 17a and a flange portion 17b. The boss portion 17a is formed in a cylindrical shape, is fitted to a portion in which an end portion of the rotating shaft 14 on the compressor 13 side is formed in a small diameter via the step portion 14b, abuts against the step portion 14b to be positioned in the axial direction, and is inserted into the insertion hole 23a of the thrust bearing 23 along with the rotating shaft 14. The flange portion 17b is a disk member which protrudes radially outward from a portion of the boss portion 17a abutting against the step portion 14b, and includes one facing portion 17ba disposed to face a plate surface 23c of the thrust bearing 23 on the journal bearing 22 side in the axial direction and the other facing portion 17bb disposed to face the side surface portion 22d of the journal bearing 22 with the gap D therebetween in the axial direction.

As shown in FIG. 3, the thrust sleeve 18 includes a boss portion 18a and a flange portion 18b. The boss portion 18a is formed in a cylindrical shape, is fitted to a portion which is formed in a small diameter on the end portion of the rotating shaft 14 on the compressor 13 side, and abuts against the end surface of the boss portion 17a on the compressor 13 side in the thrust ring 17 to be positioned in the axial direction. The flange portion 18b is a disk member which protrudes radially outward from a portion of the boss portion 18a abutting against the boss portion 17a of the thrust ring 17, and includes one facing portion 18ba which is disposed to face a plate surface 23d of the thrust bearing 23 on the compressor 13 side in the axial direction and the other facing portion 18bb which is disposed to face an oil storage portion 19 forming an oil storage space 19a from the compressor 13 side toward the thrust bearing 23 side in the axial direction.

That is, each of the thrust ring 17 and the thrust sleeve 18 is disposed such that the thrust bearing 23 is interposed between the facing portions 17ba and 18ba positioned one side of the flange portions 17b and 18b. Accordingly, the thrust bearing 23 regulates the axial movement of the rotating shaft 14 via the thrust ring 17 and the thrust sleeve 18.

In addition, the oil storage portion 19 is provided to be adjacent to the compressor 13 side of the thrust bearing 23 in the axial direction, the oil storage space 19a is disposed along the vicinity of the rotating shaft 14, and a lower portion of the oil storage space 19a is open and communicates with the lower portion of the third space portion S3. The oil storage portion 19 includes a tongue piece 19b which extends from the lower side of the oil storage portion 19, and the oil storage space 19a communicates with the lower portion of the third space portion S3 via the tongue piece 19b. In FIG. 1, the oil storage portion 19 is configured of a deflector. The deflector is formed of a plate shape and is attached between an insert portion 20 and the thrust bearing 23. The insert portion 20 forms a partition wall between the second space portion S2 of the bearing housing 15C and the third space portion S3, causes the boss portion 18a of the thrust sleeve 18 to communicate with the rotating shaft 14, and supports the deflector with respect to the bearing housing 15C along with the thrust bearing 23.

In addition, a passage 23b is formed in the thrust bearing 23. A base end portion of the passage 23b communicates with the tip end portion of the fifth supply passage 45, and a tip end portion thereof communicates with the insertion hole 23a. Accordingly, the lubricating oil supplied from the fifth supply passage 45 to the insertion hole 23a via the passage 23b, and is led to portions between the respective plate surfaces 23c and 23d of the thrust bearing 23 and the respective facing portions 17ba and 18ba of the flange portions 17b and 18b. Accordingly, the thrust bearing 23 decreases a friction resistance between the facing portions 17ba and 18ba by the lubricating oil supplied to the portion between the respective facing portions 17ba and 18ba of the flange portions 17b and 18b while regulating the axial movement of the rotating shaft 14 between the facing portions 17ba and 18ba.

In the thrust bearing 23, on the facing portion 18ba side of the flange portion 18b of the thrust sleeve 18, the lubricating oil is fed to the radially outer side by the centrifugal force of the rotation of the rotating shaft 14, a portion of the lubricating oil flows to the lower portion of the third space portion S3 on the lower side of the flange portion 18b along an outer peripheral portion of the flange portion 18b, and a portion of the lubricating oil reaches the oil storage space 19a of the oil storage portion 19 (deflector). Accordingly, the lubricating oil which has reached the oil storage space 19a flows to the lower portion of the third space portion S3 along the tongue piece 19b of the oil storage portion 19. Meanwhile, on the facing portion 17ba side of the flange portion 17b of the thrust ring 17, the lubricating oil is fed to the radially outer side by the centrifugal force of the rotation of the rotating shaft 14. A clearance 48 is formed between the outer peripheral portion of the flange portion 17b and the bearing housing 15C, and the clearance 48 communicates with the lower portion of the third space portion. Accordingly, the lubricating oil fed to the radially outer side on the facing portion 17ba side flows to the lower portion of the third space portion S3 through the clearance 48.

In addition, the journal bearing 22 adjacent to the thrust bearing 23, the lubricating oil supplied to the outer peripheral surface 22b side and the inner peripheral surface 22c side flows from the passage 16b of the support portion 16 to the lower portion of the third space portion S3 on the turbine 12 side. Meanwhile, in the journal bearing 22 adjacent to the thrust bearing 23, the lubricating oil supplied to the outer peripheral surface 22b side and the inner peripheral surface 22c side flows to the side surface portion 22d side on the thrust bearing side, is fed to the radially outer side by the centrifugal force of the rotation of the rotating shaft 14 in the facing portion 17bb of the flange portion 17b of the facing thrust ring 17, and flows to the lower portion of the third space portion S3 through the clearance 48.

In addition, although it is not shown in the drawings, in the bearing housing 15C, the base end portion of the lubricating oil discharge pipe is connected to the lower portion of the third space portion S3. A tip end portion of the lubricating oil discharge pipe is connected to an oil pan. The oil pan is connected to the lubricating oil tank, which is connected to first supply passage 41 of the lubricating oil supply passage 40, via a lubricating oil circulation line. An oil pump and an oil filter are interposed in the lubricating oil circulation line, and the lubricating oil of which impurities are filtered by the oil filter is fed from the oil pan to the lubricating oil tank via the lubricating oil circulation line by the oil pump. In addition, the lubricating oil is supplied from the lubricating oil tank to the first supply passage 41.

Figure 4:
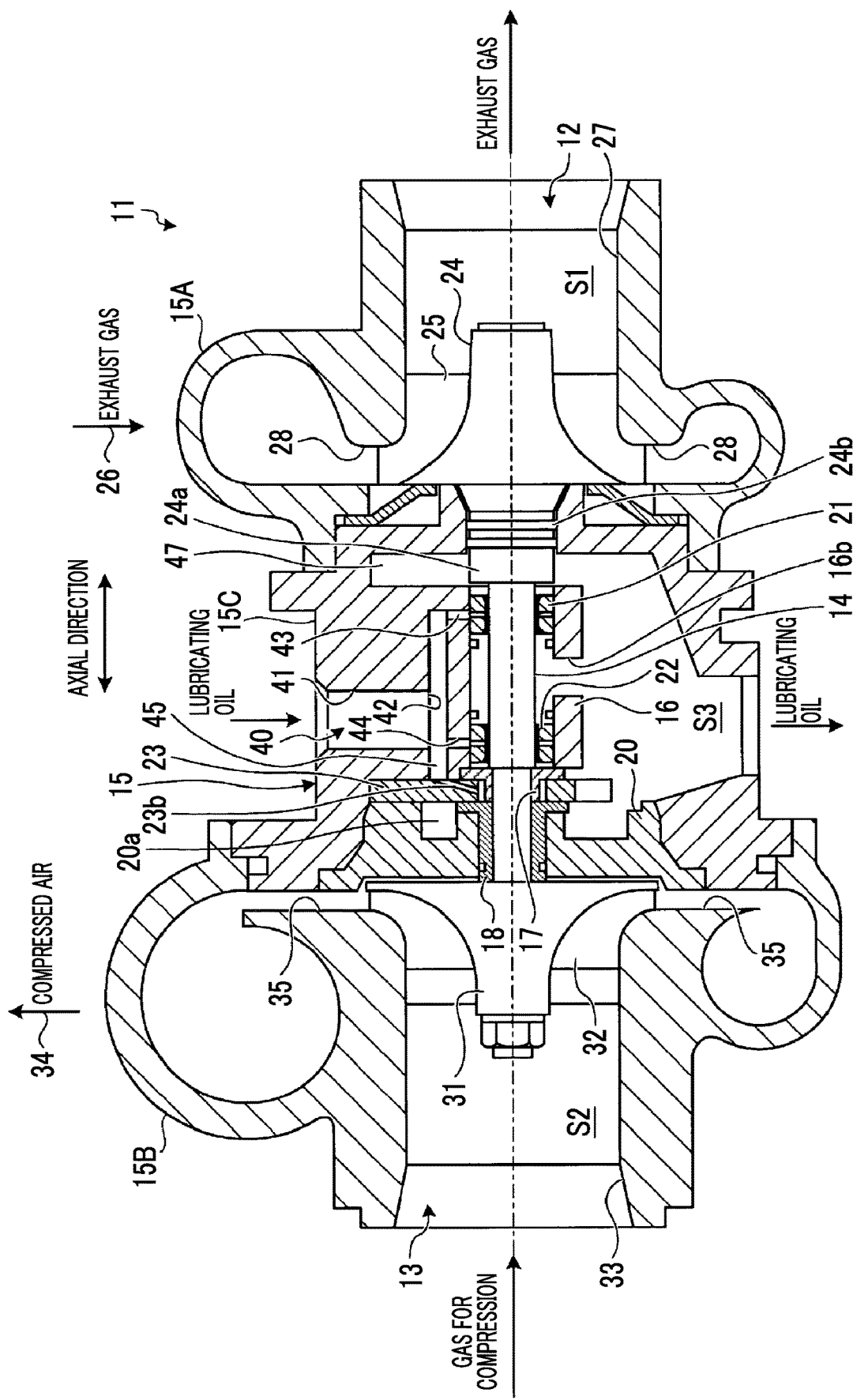
FIG. 4 is an overall configuration view of another example of the exhaust turbine turbocharger according to the embodiment of the present invention.

FIG. 4 is an overall configuration view of another example of the exhaust turbine turbocharger according to the embodiment of the present invention.

An exhaust turbine turbocharger 11 shown in FIG. 4 has an oil storage portion 20 having a configuration different from that of the exhaust turbine turbocharger 11 shown in FIG. 1, and other configurations are similar those of the exhaust turbine turbocharger 11 shown in FIG. 1. Accordingly, with respect to the exhaust turbine turbocharger 11 shown in FIG. 4, only the oil storage portion 20 will be described, the same reference numerals are assigned to other configurations, and descriptions thereof are omitted.

The oil storage portion 20 is provided to be adjacent to the compressor 13 side of the thrust bearing in the axial direction, an oil storage space 20a is disposed along the vicinity of the rotating shaft 14, and a lower portion of the oil storage space 20a is open and communicates with the lower portion of the third space portion S3. In FIG. 4, the oil storage portion 20 is configured of an insert portion without having a deflector. In FIG. 4, the insert portion forms a partition wall between the second space portion S2 and the third space portion S3 of the bearing housing 15C, causes the boss portion 18a of the thrust sleeve 18 to communicate with the rotating shaft 14, and supports the thrust bearing 23 with respect to the bearing housing 15C.

In addition, in the thrust bearing 23, the lubricating oil supplied from the fifth supply passage 45 to the insertion hole 23a via the passage 23b, and is led to portions between the respective plate surfaces 23c and 23d of the thrust bearing 23 and the respective facing portions 17ba and 18ba of the flange portions 17b and 18b. In the thrust bearing 23, on the facing portion 18ba side of the flange portion 18b of the thrust sleeve 18, the lubricating oil is fed to the radially outer side by the centrifugal force of the rotation of the rotating shaft 14, a portion of the lubricating oil flows to the lower portion of the third space portion S3 on the lower side of the flange portion 18b along an outer peripheral portion of the flange portion 18b, and a portion of the lubricating oil reaches the oil storage space 20a of the oil storage portion (insert portion) 20. Accordingly, the lubricating oil which has reached the oil storage space 20a flows to the lower portion of the third space portion S3.

Hereinafter, a bearing device in the present invention will be described with reference to FIGS. 5 to 13. The bearing device of the present embodiment relates to the above-described oil storage portions 19 and 20 and the thrust bearing 23.

Figure 5:
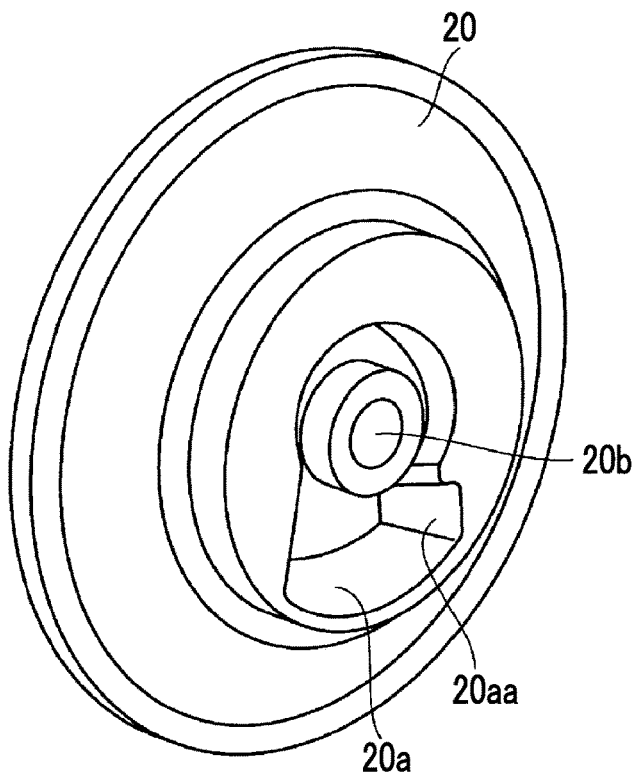
FIG. 5 is an enlarged perspective view showing an example of a bearing device according to the embodiment of the present invention.
Figure 6:
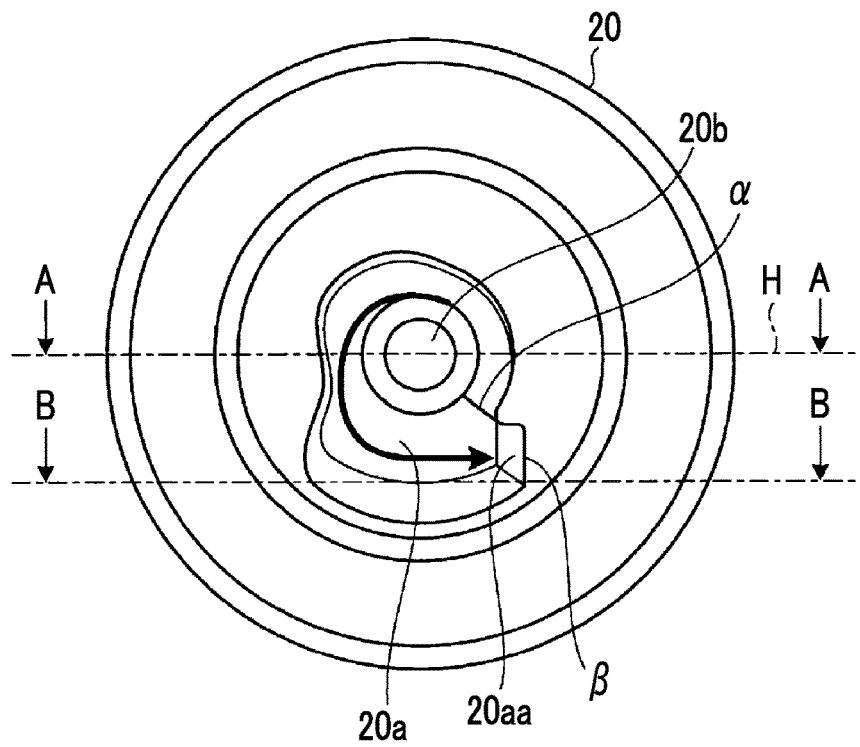
FIG. 6 is an enlarged front view showing an example of the bearing device according to the embodiment of the present invention.
Figure 7:
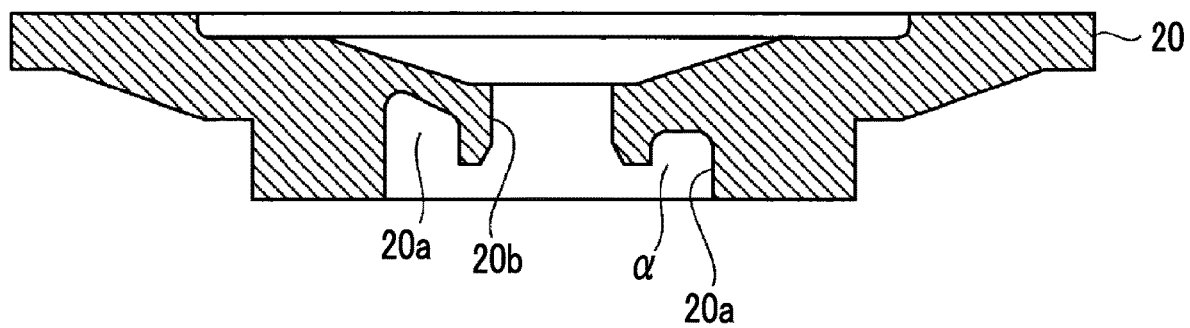
FIG. 7 is a sectional view taken along line A-A in FIG. 6.
Figure 8:
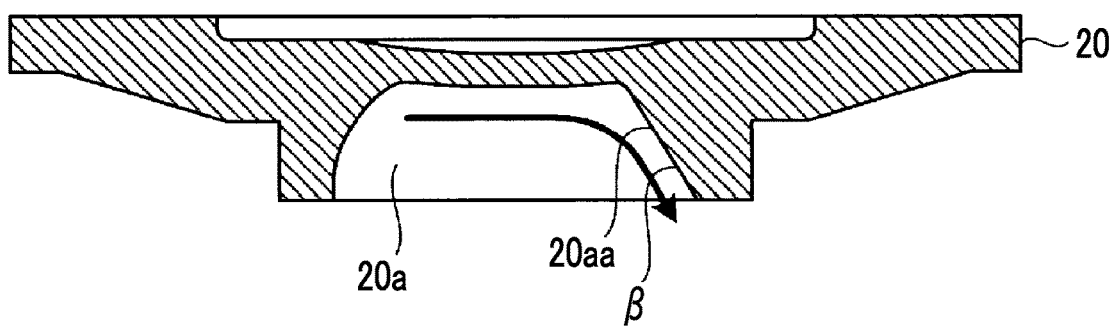
FIG. 8 is a sectional view taken along line B-B in FIG. 6.
Figure 9:
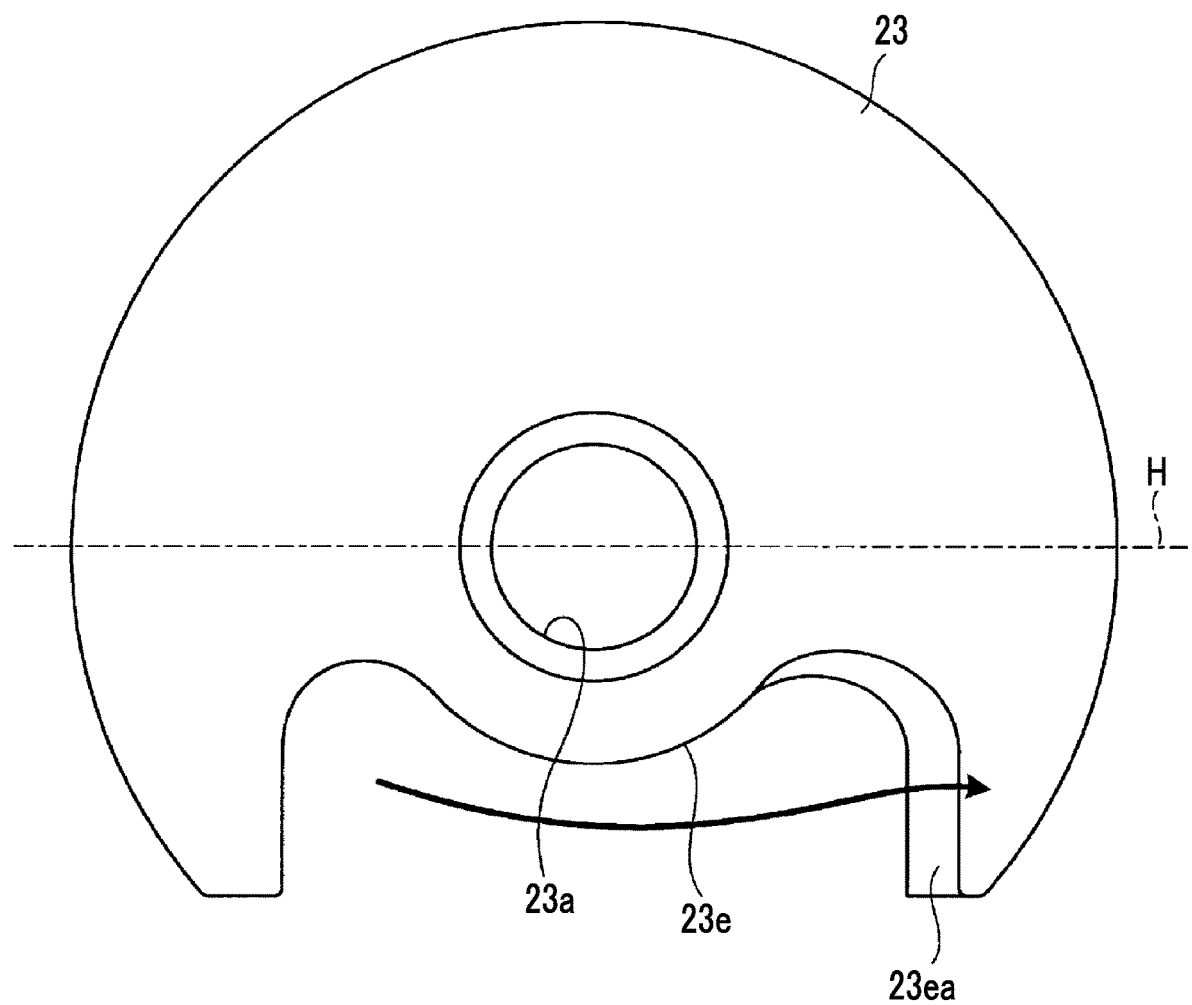
FIG. 9 is an enlarged front view showing an example of the bearing device according to the embodiment of the present invention.

FIG. 5 is an enlarged perspective view showing an example of the bearing device according to the present embodiment. FIG. 6 is an enlarged front view showing the example of the bearing device according to the embodiment of the present invention. FIG. 7 is a sectional view taken along line A-A in FIG. 6. FIG. 8 is a sectional view taken along line B-B in FIG. 6. FIG. 9 is an enlarged front view showing an example of the bearing device according to the embodiment of the present invention.

FIGS. 5 to 8 show the oil storage portion 20 configured of the insert portion. As shown in FIGS. 5 to 8, in the oil storage portion 20, a recessed portion in which the oil storage space 20a is formed is provided on the thrust bearing 23 side. In addition, in the oil storage portion 20, an insertion hole 20b into which the boss portion 18a of the thrust sleeve 18 and the rotating shaft are inserted is formed at the center of the oil storage portion 20. In addition, in FIG. 6, the rotating shaft 14 is rotated counterclockwise (in the counterclockwise direction) about the insertion hole 20b.

In a rotation direction of the rotating shaft 14, when a portion from a lower side of a horizontal plane (line A-A in FIG. 6) H passing through the center of the rotating shaft 14 toward an upper side thereof is defined as a starting end α, the oil storage space 20a is formed in a groove shape to draw an arc from the starting end α to a terminal end β almost one round so as to surround the insertion hole 20b (rotating shaft 14) counterclockwise about the insertion hole 20b. In addition, as shown in FIGS. 6 to 8, the oil storage space 20a is formed such that a groove depth or a groove width is gradually enlarged from the starting end α toward the terminal end β.

In addition, in the oil storage portion 20, in the oil storage space 20a, the terminal end β is formed in a region (a region below line A-A in FIG. 6) below the horizontal plane H passing through the center of the rotating shaft 14, and as shown in FIG. 8, an inclined surface 20aa which is inclined in the rotation direction of the rotating shaft 14 while protruding toward the thrust bearing 23 side is formed on the terminal end β. The most protruding position of the inclined surface 20aa is the terminal end β of the oil storage space 20a.

As shown in FIG. 9, the thrust bearing 23 facing the oil storage space 20a is formed in a disk shape having the insertion hole 23a into which the rotating shaft 14 is inserted, and a notch 23e is formed in a region below the horizontal plane H passing through the center of the rotating shaft 14. The lower portion of the oil storage space 20a is opened by the notch 23e to communicate with the lower portion of the third space portion S3, and a portion of the oil storage space 20a other than the notch 23e becomes a closed space. In addition, the notch 23e is formed according to the shape of the oil storage space 20a and is formed such that an opening end 23ea of the notch 23e coincides with the terminal end β of the oil storage space 20a. That is, the opening end 23ea of the notch 23e of the thrust bearing 23 coincides with the most protruding terminal end β of the inclined surface 20aa of the oil storage space 20a of the oil storage portion 20, and thus, the opening end 23ea is provided continuously with the inclined surface 20aa. In addition, the opening end 23ea of the notch 23e of the thrust bearing 23 is formed to have an inclined surface which is continuous with the inclined surface 20aa of the oil storage space 20a of the oil storage portion 20.

In this configuration, the lubricating oil which has reached the oil storage space 20a flows to the lower portion of the third space portion S3 from the oil storage space 20a by the notch 23e of the thrust bearing 23. However, as shown by an arrow in FIG. 6, the lubricating oil flows counterclockwise (in the counterclockwise direction) about the insertion hole 20b (rotating shaft 14) from the starting end α of the oil storage space 20a to the terminal end β thereof in the rotation direction of the rotating shaft 14. In addition, in the terminal end β of the oil storage space 20a, as shown by an arrow in FIG. 8, the flowing lubricating oil is guided to the inclined surface 20aa to be fed to the thrust bearing 23 side and flows to the lower portion of the third space portion S3 from the outer side opened by the notch 23e on the thrust bearing 23 side. As a result, it is possible to prevent the lubricating oil flowing through the oil storage space 20a from reflowing in from the starting end α, and thus, it is possible to improve the drainability of the lubricating oil in the thrust bearing 23.

In addition, if the opening end 23ea of the notch 23e coincides with the terminal end β of the oil storage space 20a in which the inclined surface 20aa is formed, the following excellent effects can be obtained. That is, it is possible to prevent the lubricating oil guided to the inclined surface 20aa by the opening end 23ea of the notch 23e from being cut, and thus, it is possible to prevent the lubricating oil flowing through the oil storage space 20a from reflowing in from the starting end α.

In addition, the opening end 23ea of the notch 23e is formed to have the inclined surface, and thus, the following excellent effects can be obtained. That is, it is possible to prevent the lubricating oil guided to the inclined surface 20aa by the opening end 23ea of the notch 23e from being cut while being guided to the outer side further opened from the inclined surface of the opening end 23ea, and thus, it is possible to prevent the lubricating oil flowing through the oil storage space 20a from reflowing in from the starting end α.

Figure 10:
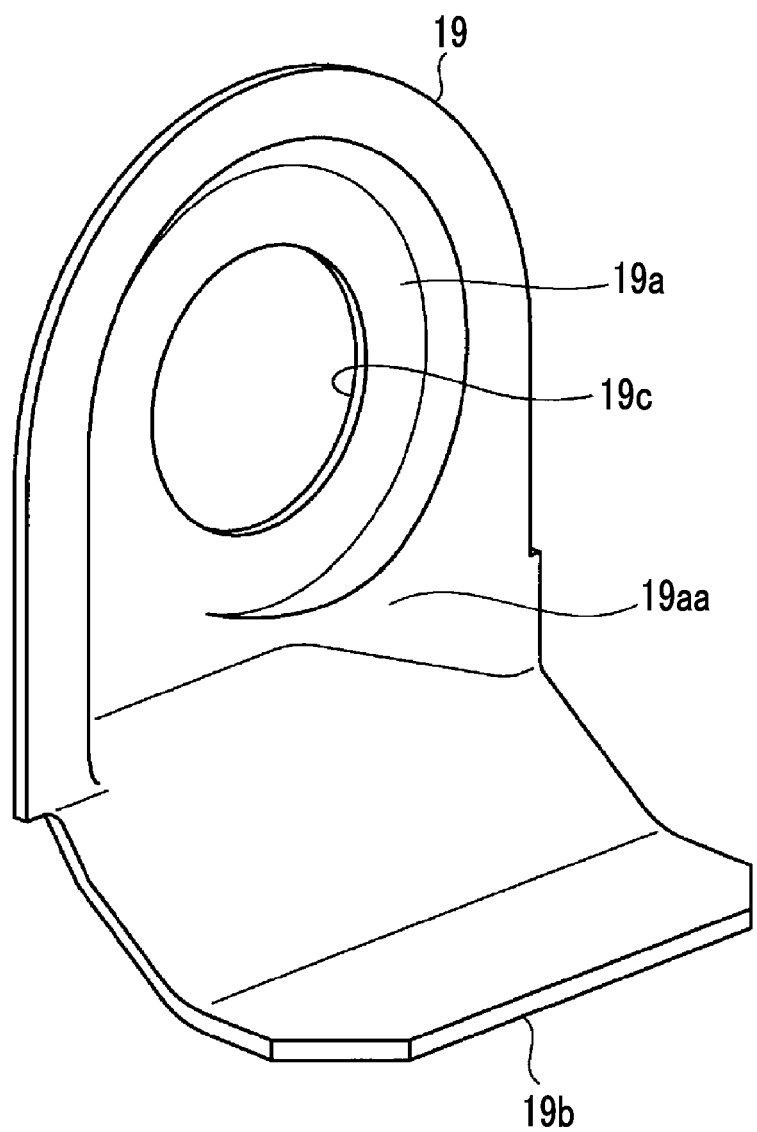
FIG. 10 is an enlarged perspective view showing an example of the bearing device according to the embodiment of the present invention.
Figure 11:
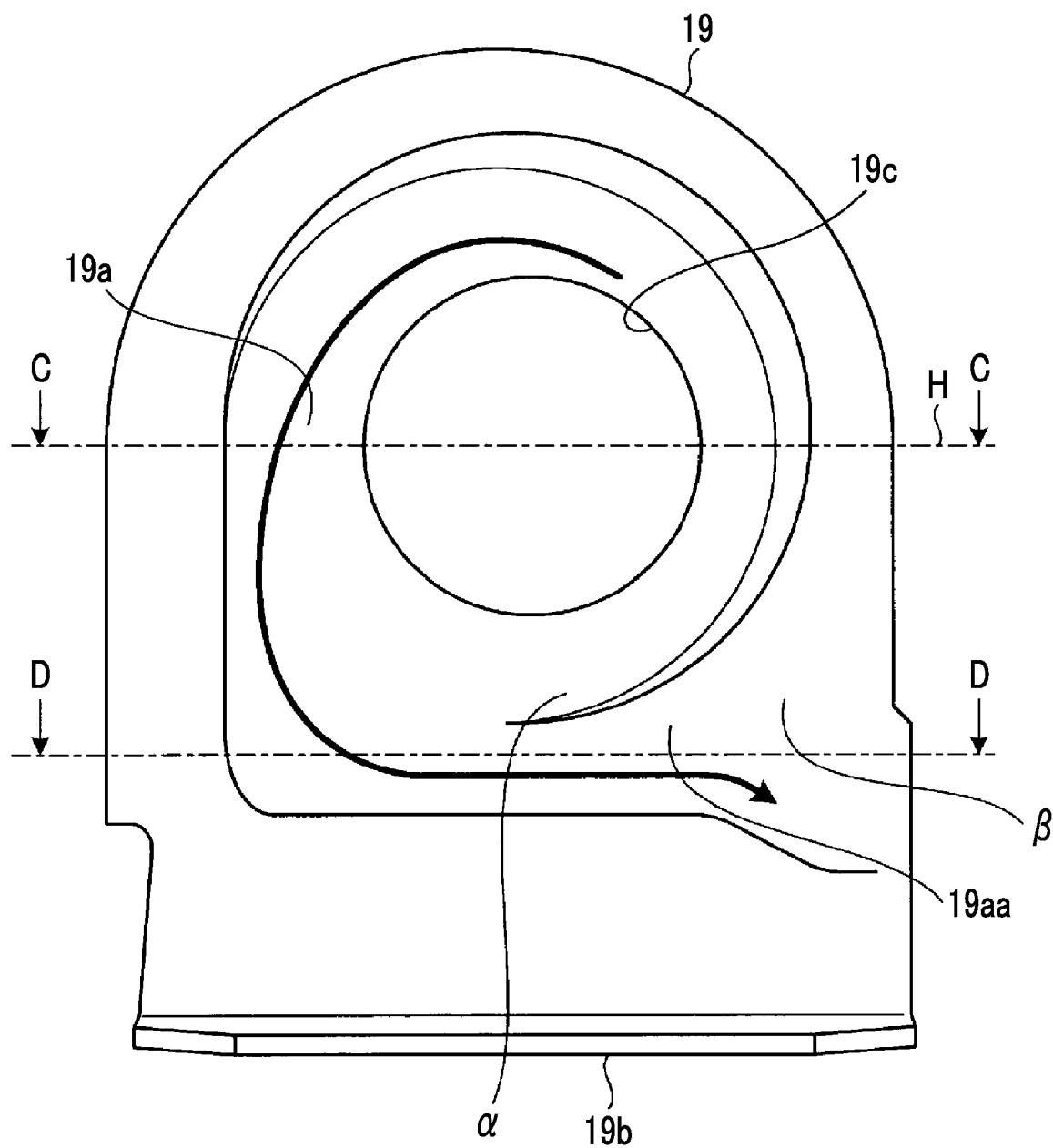
FIG. 11 is an enlarged front view showing the example of the bearing device according to the embodiment of the present invention.
Figure 12:
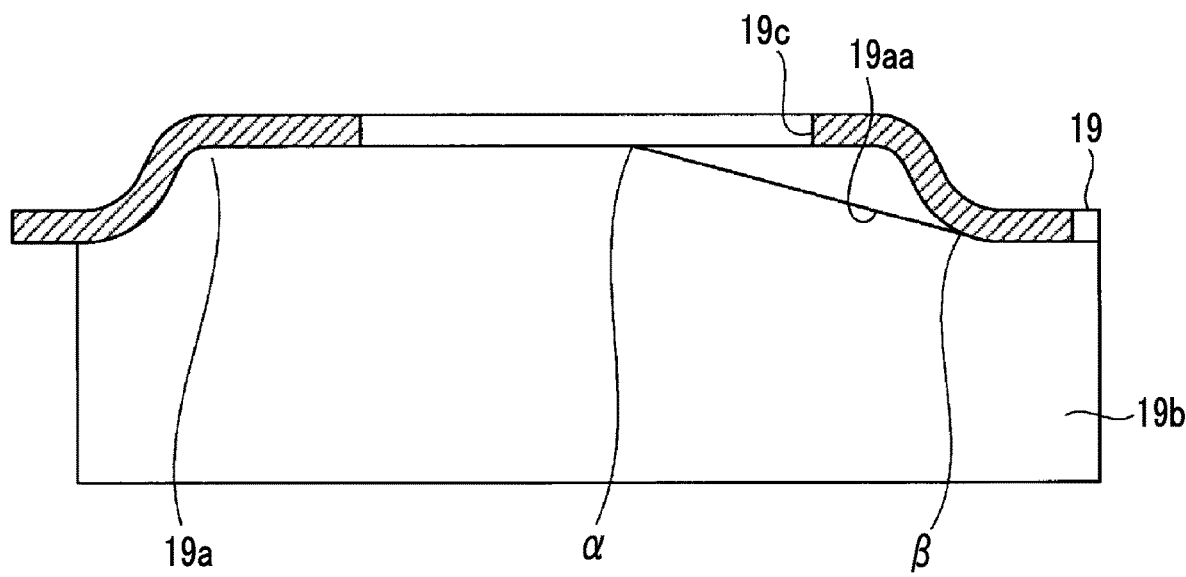
FIG. 12 is a sectional view taken along line C-C in FIG. 11.
Figure 13:
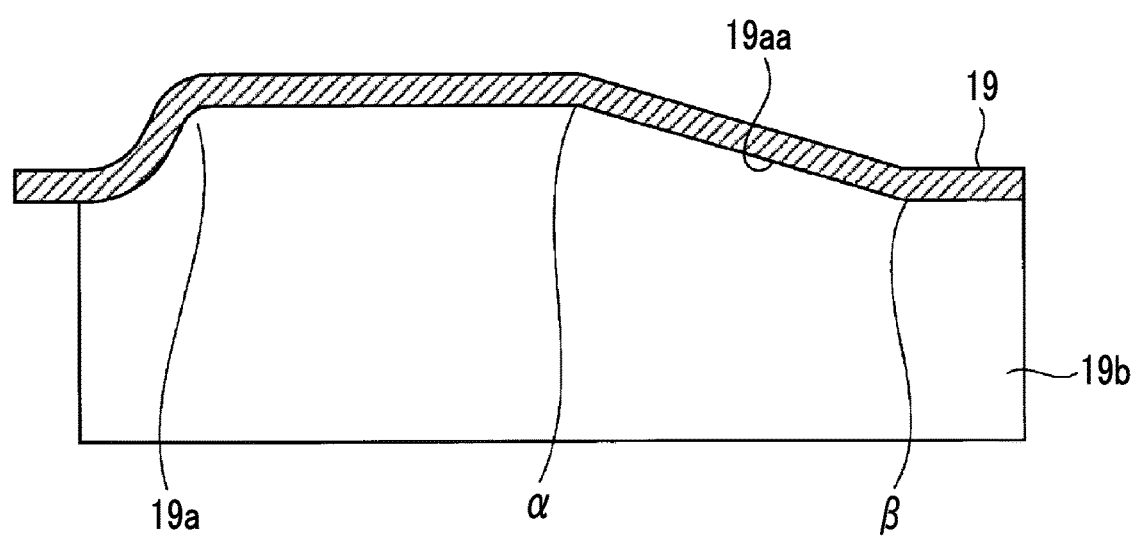
FIG. 13 is a sectional view taken along line D-D in FIG. 11.

FIG. 10 is an enlarged perspective view showing an example of the bearing device according to the present embodiment. FIG. 11 is an enlarged front view showing the example of the bearing device according to the present embodiment. FIG. 12 is a sectional view taken along line C-C in FIG. 11. FIG. 13 is a sectional view taken along line D-D in FIG. 11.

FIGS. 10 to 13 shows the oil storage portion 19 configured of the deflector. As shown in FIGS. 10 to 13, in the oil storage portion 19, a recessed portion forming the oil storage space 19a is formed on the thrust bearing side. In addition, an insertion hole 19c into which the boss portion 18a of the thrust sleeve 18 is inserted along with the rotating shaft 14 is formed at the center of the oil storage portion 19. In addition, in FIG. 11, the rotating shaft 14 is rotated counterclockwise (in the counterclockwise direction) about the insertion hole 19c.

In the rotation direction of the rotating shaft 14, when a portion from a lower side of a horizontal plane (line C-C in FIG. 11) H passing through the center of the rotating shaft 14 toward an upper side thereof is defined as a starting end α, the oil storage space 19a is formed to draw an arc from the starting end α to a terminal end β almost one round so as to surround the insertion hole 19c (rotating shaft 14) counterclockwise about the insertion hole 19c.

In addition, in the oil storage space 19a of the oil storage portion 19, the terminal end β is formed in a region (a region below line C-C in FIG. 11) below the horizontal plane H passing through the center of the rotating shaft 14, and thus, as shown in FIG. 13, in the terminal end β, an inclined surface 19aa which is inclined in the rotation direction of the rotating shaft 14 while protruding toward the thrust bearing 23 side is formed. A most protruding position of the inclined surface 19aa is the terminal end β of the oil storage space 19a.

As shown in FIG. 9, the thrust bearing 23 facing the oil storage space 19a is formed in a disk shape having the insertion hole 23a into which the rotating shaft 14 is inserted, and a notch 23e is formed in the region below the horizontal plane H passing through the center of the rotating shaft 14. The lower portion of the oil storage space 19a is opened by the notch 23e to communicate with the lower portion of the third space portion S3, and a portion of the oil storage space 19a other than the notch 23e becomes a closed space. In addition, the notch 23e is formed according to the shape of the oil storage space 19a and is formed such that the opening end 23ea of the notch 23e coincides with the terminal end β of the oil storage space 19a. That is, the opening end 23ea of the notch 23e of the thrust bearing 23 coincides with the most protruding terminal end β of the inclined surface 19aa of the oil storage space 19a of the oil storage portion 19, and thus, the opening end 23ea is provided continuously with the inclined surface 19aa. In addition, the opening end 23ea of the notch 23e of the thrust bearing 23 is formed to have an inclined surface which is continuous with the inclined surface 19aa of the oil storage space 19a of the oil storage portion 19.

In this configuration, the lubricating oil which has reached the oil storage space 19a flows to the lower portion of the third space portion S3 from the oil storage space 19a by the notch 23e of the thrust bearing 23. However, as shown by an arrow in FIG. 11, the lubricating oil flows counterclockwise (in the counterclockwise direction) about the insertion hole 19c (rotating shaft 14) from the starting end α of the oil storage space 19a to the terminal end β thereof in the rotation direction of the rotating shaft 14. In addition, in the terminal end β of the oil storage space 19a, as shown by an arrow in FIG. 13, the flowing lubricating oil is guided to the inclined surface 19aa to be fed to the thrust bearing 23 side and flows to the lower portion of the third space portion S3 from the outer side opened by the notch 23e on the thrust bearing 23 side. As a result, it is possible to prevent the lubricating oil flowing through the oil storage space 19a from reflowing in from the starting end α, and thus, it is possible to improve the drainability of the lubricating oil in the thrust bearing 23.

In addition, if the opening end 23ea of the notch 23e coincides with the terminal end β of the oil storage space 19a in which the inclined surface 19aa is formed, the following excellent effects can be obtained. That is, it is possible to prevent the lubricating oil guided to the inclined surface 19aa by the opening end 23ea of the notch 23e from being cut, and thus, it is possible to prevent the lubricating oil flowing through the oil storage space 19a from reflowing in from the starting end α.

In addition, the opening end 23ea of the notch 23e is formed to have the inclined surface, and thus, the following excellent effects can be obtained. That is, it is possible to prevent the lubricating oil guided to the inclined surface 19aa by the opening end 23ea of the notch 23e from being cut while being guided to the outer side further opened from the inclined surface of the opening end 23ea, and thus, it is possible to prevent the lubricating oil flowing through the oil storage space 19a from reflowing in from the starting end α.

REFERENCE SIGNS LIST

11: exhaust turbine turbocharger
12: turbine
13: compressor
14: rotating shaft
15: housing
19: oil storage portion (deflector)
19a: oil storage space
19aa: inclined surface
20: oil storage portion (insert portion)
20a: oil storage space
20aa: inclined surface
23: thrust bearing
23e: notch
23ea: opening end
H: horizontal plane

The invention claimed is:

1. A bearing device comprising:
a rotating shaft;
a thrust bearing which is provided on the rotating shaft and regulates an axial movement of the rotating shaft; and
an oil storage portion which includes an oil storage space which is adjacent to the thrust bearing in an axial direction to be formed in an arc shape to surround the rotating shaft and is formed to have an opened lower portion and into which lubricating oil flows, the oil storage portion having a first inclined surface which is formed to be inclined in a rotation direction of the rotating shaft while protruding toward the thrust bearing side in a region below a horizontal plane passing through a center of the rotating shaft in the oil storage space,
wherein a notch is formed in a lower portion of the thrust bearing and an opening end is formed on a forward side in a flow direction of the lubricating oil of the notch, the opening end coincides with a most protruding terminal end of the first inclined surface, and a second inclined surface formed on the opening end of the thrust bearing and the first inclined surface of the oil storage portion form a continuous surface.

2. The bearing device according to claim 1, wherein the oil storage portion includes a plate-shaped deflector provided between the thrust bearing and an insert portion supporting the thrust bearing with respect to a bearing housing in which the rotating shaft and the thrust bearing are accommodated.

3. The bearing device according to claim 1, wherein the oil storage portion includes an insert portion supporting the thrust bearing with respect to a bearing housing in which the rotating shaft and the thrust bearing are accommodated.

4. An exhaust turbine turbocharger comprising:
the bearing device according to claim 1;
a turbine;
a compressor; and
the rotating shaft which coaxially connects the turbine and the compressor to each other.

5. The bearing device according to claim 1, wherein the oil storage space has a width enlarging portion where enlarging the width in a radial direction of the rotating shaft, along with the flowing direction of the rubricating oil, in the region below the horizontal plane.

\* \* \* \* \*